United States Patent Office 3,093,092
Patented June 11, 1963

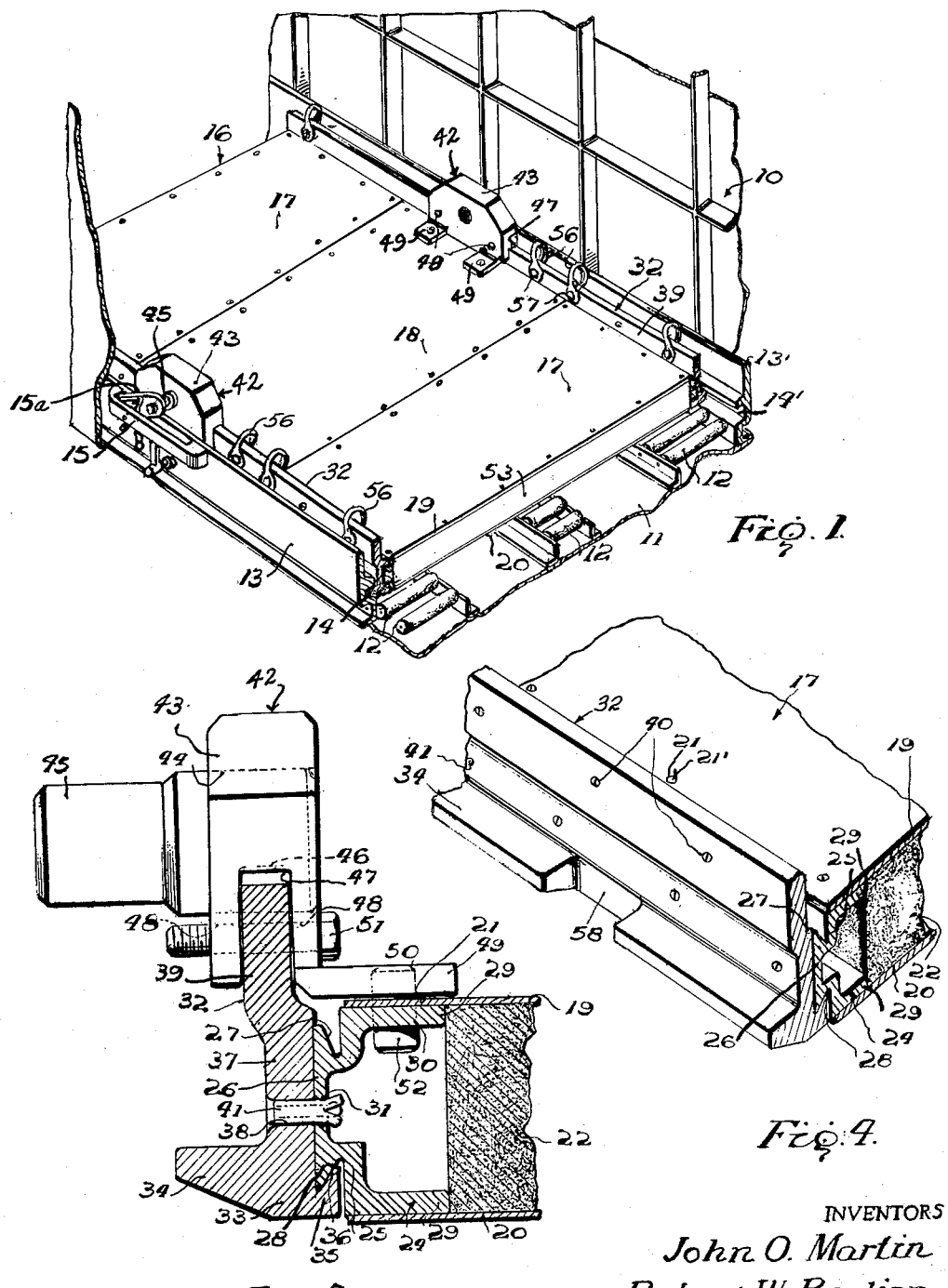

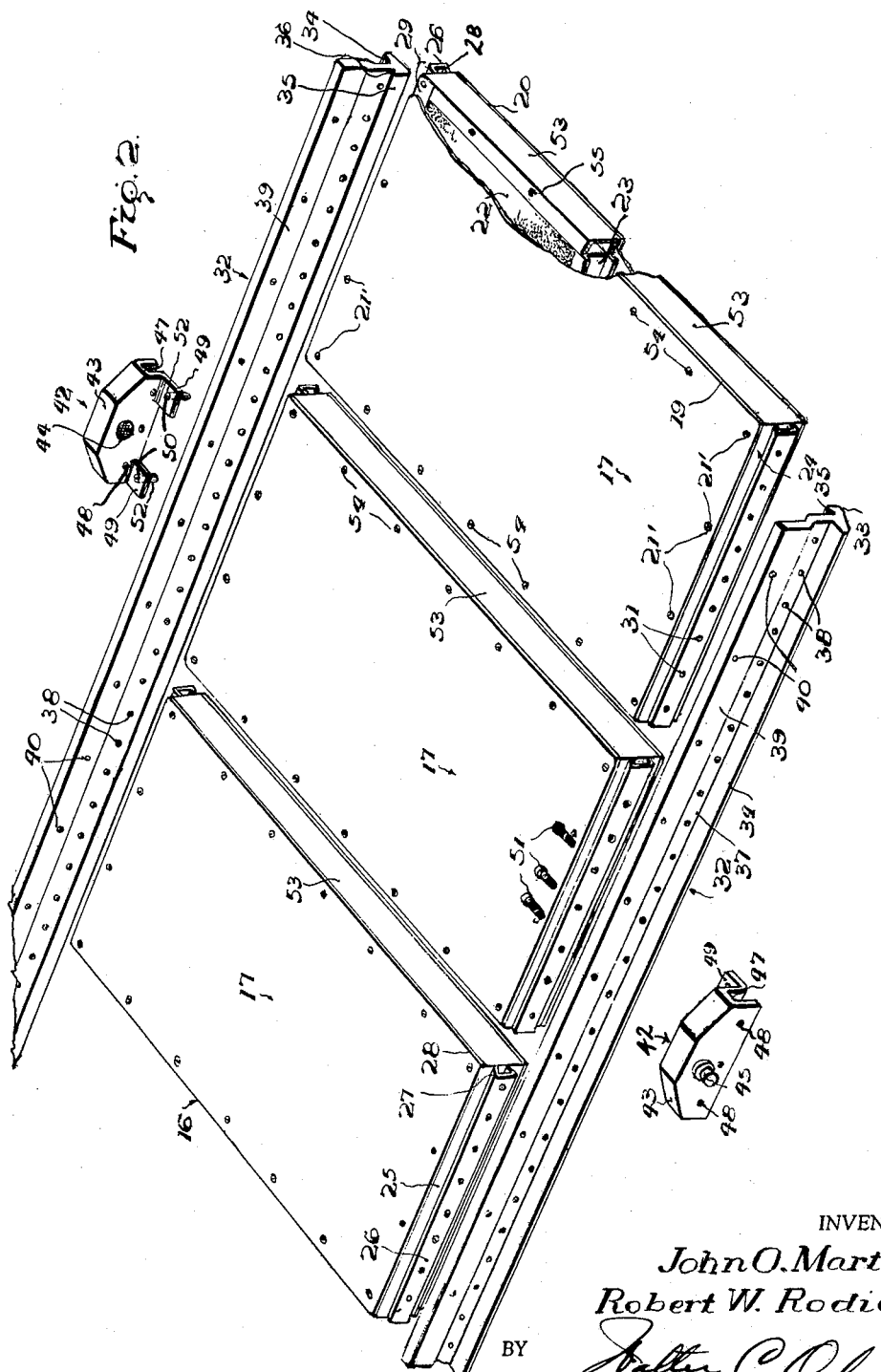

3,093,092
CARGO PALLET
John O. Martin, South Lincoln, and Robert W. Rodier, Southboro, Mass., assignors to the United States of America as represented by the Secretary of the Army
Filed Apr. 18, 1962, Ser. No. 188,589
12 Claims. (Cl. 105—369)
(Granted under Title 35, U.S. Code (1952), sec. 266)

The invention described herein, if patented, may be manufactured and used by or for the Government for governmental purposes, without payment to us of any royalty thereon.

Our invention relates to a multi-sectional cargo pallet, and more particularly, to a cargo pallet for use in vehicles equipped with a multi-rail restraint and guidance system.

An object of our invention is to provide a light weight multi-panel cargo pallet for use in an aircraft or the like equipped with a multi-rail restraint and guidance system.

Another object of our invention is to provide a pallet providing restraint and guidance means adapted to function with the restraint and guidance system in an aircraft or the like.

Still another object of our invention is to provide a semi-expendable pallet comprising reversible panels.

A further object of our invention is to provide a cargo pallet capable of being ejected from an aircraft by parachute which is relatively low in height and still has cushionable properties to protect the cargo upon landing.

Still another object of our invention is to furnish an economical all purpose pallet for transporting and/or parachute dropping vehicles, weapons and supplies from cargo aircraft equipped with multi-rail restraint and guidance system.

A further object of our invention is to provide a light weight multi-panel pallet which can be assembled rapidly and used effectively by personnel having little or no specialized training and tools.

Other objects and advantages of our invention will be apparent during the course of the following description.

In the accompanying drawing, forming a part of this application and in which like numerals are employed to designate like parts throughout the same:

FIGURE 1 is a fragmentary perspective view of our invention showing the pallet in an aircraft or the like;

FIGURE 2 is an exploded view of the pallet illustrating its component parts with a portion of one of the panels broken away;

FIGURE 3 is a cross sectional fragmentary view of a side rail secured to the pallet with a pin restraint member mounted thereon; and FIGURE 4 is a fragmentary perspective view of our pallet illustrating a modified form of the restraint means.

In the drawing wherein for the purpose of illustration is shown a preferred embodiment of our invention, the numeral 10 indicates generally a portion of a vehicle such as an aircraft having a floor 11 with roller type conveyors 12 secured thereto. Within the vehicle 10 and preferably along its side walls is a dual rail guidance and restraint system comprising fixed rails 13, 13' having longitudinal grooves 14, 14' and a so-called restraint means in the form of a strap-like keeper or U-shaped member 15 secured to the outer surface of each rail 13, 13', see FIGURE 1. For the purposes of illustration, a vertically movable pin releasing type restraint means 15 is shown. However, as will be brought out later in this specification, a horizontally movable restraint means (not shown) may be employed.

Turning now to our invention, the pallet assembly or platform generally indicated at 16 is composed of panels 17 and/or 18. Panels 17 and 18 are identical except for their length which varies to provide for the assembling of pallets of varying lengths. Preferably panel 17 is 3 feet long while panel 18 is 4 feet in length. It will be seen that the pallets may vary in length from 3, 4 and 6 feet upwards, depending upon the combination of panels selected.

Each of the panels 17, 18 is of sandwich construction having top and bottom surface plates, or sheets, preferably of aluminum, indicated at 19 and 20, respectively, with a plurality of openings 21 around its outer periphery; a yieldable yet relatively high strength core 22 which is preferably a block of plastic foam, such as styrofoam, or the like; and an I beam 23 which is also preferably of aluminum stock. The sides of the panels 17, 18 are closed by side channels 24. The webs or portions 25 of the channels 24 have exterior lengthwise bosses or projections 26 providing upper and lower V-shaped grooves 27, 28, while the legs or flanges 29 have openings 30 extending therethrough. The top and bottom panel surfaces 19, 20, are secured to the side members 24 by any suitable means such as rivets 21' which extend through the openings 21 in the panels and 30 in the side members. The bosses 26 are provided with a plurality of openings 31.

The elongated side rails 32 comprise a base 33 having an outer upwardly tapered horizontal flange 34 and an inner flange member 35 providing a groove 36; a mid-portion 37 with a series of openings 38 extending therethrough; and a vertical flange 39 with a plurality of openings 40. The side rails 32 are secured to the bosses 26 of the side members 24 through the openings 38 and 31 by any suitable means such as hammer driven expansion rivets 41.

A pin restraint fitting generally indicated by numeral 42 comprises a block 43 having an opening 44 therein receiving a restraint pin 45. The pin 45 has a transverse slot 46 through its lower portion. The pin 45 also carries a latch or swingable member 15a which cooperates with the keeper 15 of the restraint means, see FIGURE 1. The block 43 terminates in a channel shaped base 47 provided with transverse threaded openings 48 and rearwardly projecting ears 49 having openings 50 therein. The block 43 is secured to the side rail 32 by any suitable means such as screws 51 which extend through the openings 40 and 48; and to the top surface 19 of the panels 17 or 18 by pins 52, or other suitable means, which extend through the openings 50, 21, and 30.

The open ends of the panels 17, 18 are closed by channel-shaped cover plates or strips 53 and secured by means of rivets 54 which extend through openings 21 in the panel and 55 in the upper and lower flanges of the cover plates 53.

Cargo tiedown loops 56 are secured to the flange 39 of the side rails 32 by bolts 57, or other suitable means, extending through openings 40.

In the modification shown in FIG. 4, the side rail 32 is provided with a notched portion 58 in its bottom flange 34. The notched portion 58 cooperates with a horizontally operated restraint member (not shown) in an aircraft when same is used in lieu of the vertically movable pin releasing type restraint means, indicated as a whole at 15 in FIG. 1.

The panels 17, 18 are assembled into a platform or pallet 16 of a predetermined size by selecting the number and size panels required to carry a predetermined load. The side rails 32 are cut to the size of the pallet 16 and secured thereto by means of the hammer driven expansion rivets 41 (FIGURE 3) which extend through the aligned openings 38 in the side rails 32 and 31 in the side members 24. A pin restraint member 42 is mounted on each side rail 32 as aforementioned and cargo tiedown loops 56 are also secured to the side rails 32. The cargo tiedown loops 56 also serve as towing points and parachute suspension points. To release the pallet 16, as will be understood, it is merely necessary that the latches 15a be turned on their supporting pivotal means to disengage them from their respective strap-like keepers 15. The latch members 15a may vary in form, as may the means for actuating them and are usually conventional.

If the bottom of one or more of the panels 17, 18 is damaged in use or otherwise, the panel can be turned over, after drilling out the rivets 41, and used again as long as it will still pass smoothly over the conveyors 12. If both top and bottom surfaces of a panel are damaged, a new panel can be inserted in the pallet.

It is to be understood that the forms of the invention herewith shown and described are to be taken as a preferred embodiment of same, and that various changes in the shape, size, and arrangement of parts may be resorted to without departing from the spirit of our invention or the scope of the subjoined claims.

We claim:

1. The combination with a vehicle, of a multi-rail restraint and guidance system including at least two fixed rails in said vehicle; of a cargo pallet comprising at least two panels, side rails extending on opposite sides of said panels and securing the same together, said side rails slidably engaging the rails of the guidance system and having a flange portion projecting above the plane of said panels, a plurality of cargo tiedown means secured to said flange portion, restraint members have channel shaped base portions positioned on opposite sides of said pallet and astride said side rails, fastening means securing said restraint members to said side rails, and said restraint members cooperating with the fixed rails of said multi-rail restraint and guidance system to hold said pallet in said vehicle.

2. For use with a vehicle provided with a restraint and guidance system including fixed rails located adjacent the side walls of said vehicle; a cargo pallet assembly comprising at least two reversible panels in edge-to-edge relationship each panel comprising secured-together spaced top and bottom plates and a yieldable high strength core filling the space between said plates, side rails extending along two opposite sides of the panels and detachably mounted thereon to hold the panels together, said side rails having elongated portions extending upwardly beyond the panel top plates and being slidably engageable with the fixed rails of the guidance system, and releasing type restraint means including a latch member mounted upon the elongated portions of the side rails of the pallet assembly and adapted to cooperate with the fixed rails of said restraint and guidance system for releasably holding said pallet assembly in said vehicle.

3. A cargo pallet assembly according to claim 2, wherein cargo tiedown members are carried by the pallet side rails.

4. A cargo pallet assembly according to claim 2, wherein a reinforcing member extends through the core of each panel between said plates and in spaced substantial parallelism with the pallet side rails.

5. A cargo pallet assembly according to claim 2, wherein each panel has means for spacing the pair of plates thereof, and wherein said plate spacing means also provides means for detachably supporting said side rails.

6. A cargo pallet assembly according to claim 2, wherein at least one of said side rails has a cut-out portion located between its opposite ends, and wherein said releasing type restraint means is disposed in cooperable relationship with said cut-out portion.

7. A cargo pallet for use with a vehicle equipped with a multi-rail guidance system including keeper means, said pallet comprising a pair of spaced metal plates having therebetween a filling of a yieldable high strength material, edgewise positioned channels between and attached to said plates at two opposed sides thereof, cover strips located at the other two opposed sides of the pallet and also being attached to said plates, said channels and cover strips together concealing said filling, side rails removably attached to the web-portions of said channels, means for attaching the same, and a restraint fitting including at least one releasable latch member mounted on a side rail, said latch member being provided for cooperation with said guidance system keeper means to releasably hold said pallet in position in the vehicle.

8. A cargo pallet according to claim 7, wherein a structural member is incorporated in said pallet between the spaced plates thereof and intermediate said edgewise positioned channels for reinforcing the pallet.

9. A cargo pallet adapted for use in a vehicle equipped with a multi-rail guidance system which includes at least two fixed rails, comprising a reversible panel having spaced top and bottom surfaces and a yieldable core disposed between said surfaces, side members holding said surfaces and core together as a unit, each said side member having a centrally disposed exterior lengthwise projection providing longitudinal V-shaped grooves on its side edges, removable side rails disposed on opposite sides of said reversible panel, each having means engaging and cooperating with at least one of said longitudinal grooves, and means for detachably connecting the side rails to said panel.

10. A cargo pallet adapted for use in a vehicle equipped with a multi-rail restraint and guidance system including a pair of spaced fixed rails, comprising a plurality of separable reversible panel units arranged in edge-to-edge relationship, each of said panel units having spaced top and bottom sheet-like surfaces and a core filling the space between said sheet-like surfaces, channel-like members disposed at the four sides of each of said panel units for holding the sheet-like surfaces and said core together, the channel-like members at two of the opposite sides of each panel unit having projections extending lengthwise externally thereof, a pair of removable side rails common to all of said panel units and having cooperable means interfitting with the projections on the several channel-like members, and means for binding said removable side rails and panel units together to form said cargo pallet.

11. A cargo pallet according to claim 10, wherein the guidance system of the vehicle includes fixed keeper means, and wherein said pallet carries movable latch means adapted for cooperation with the keeper means when the pallet is disposed within the guidance system-equipped vehicle.

12. A cargo pallet according to claim 11, wherein the keeper means is mounted upon a fixed rail, and wherein the movable latch means is carried by a removable side rail.

References Cited in the file of this patent

UNITED STATES PATENTS 3,026,076    Bender _____ Mar. 20, 1962

FOREIGN PATENTS 1,062,462    France _____ Dec. 9, 1953
535,997    Canada _____ Jan. 22, 1957
858,596    Great Britain _____ Jan. 11, 1961